Patented June 15, 1954

2,681,314

UNITED STATES PATENT OFFICE 2,681,314

PROCESS FOR AN INORGANIC COLLOID THICKENED GREASE

John R. Skinner, San Francisco, and William E. Savage, San Leandro, Calif., assignors to Shell Development Company, Emeryville, Calif., a corporation of Delaware No Drawing. Application December 21, 1951, Serial No. 262,894

16 Claims. (Cl. 252—28)

This invention relates to a process for the preparation of lubricating greases. More particularly it is concerned with a process for the preparation of greases gelled with inorganic colloids.

Lubricating greases are mixtures of a liquid medium containing a sufficient amount of a colloidal gel to impart a semi-solid structure thereto. The normal gelling agents used in greases widely produced at the present time comprise various soaps. A relatively new type of grease has been proposed, particularly useful at elevated temperatures, wherein the gelling agent is essentially an inorganic colloid. The latter agent is exemplified by silica gel or high base exchange clays which have been treated with an onium compound to produce the so-called "onium-clays" having oleophilic properties and capable of gelling oils to impart a grease structure. For the most part these greases have been prepared by several alternative means: In the earliest process, the inorganic colloid was treated to form a gel having a highly expanded structure such as is normally found in aerogels. As opposed to this, colloids having shrunken structures, such as xerogels, are unsuitable as grease-forming agents. In preparing greases utilizing typical aerogels, former workers have either prepared the expanded aerogel to form a dry product or have found it necessary to transfer a gel from its hydrogel state into lubricating oil by means of solvent displacement. In such a process water-soluble and oil-soluble solvents, such as acetone, are employed. The expenses involved in such procedures are obvious. Any improved process eliminating the use and recovery of extraneous solvents is beneficial. The step of preparing the dry aerogel is also expensive and is to be avoided if possible.

A more recent process eliminated these two undesirable means of grease preparation by treatment of an inorganic hydrogel with a hydrophobic surface-active agent and subsequently incorporating the treated hydrogel in lubricating oil. After this incorporation it was necessary to subject the hydrous mixture to evaporation treatments in order to eliminate substantially all of the water therefrom. It will be appreciated that while this process (termed "direct transfer process") is an advance over the first two processes described, it nevertheless entails unduly extended dehydration procedures which are inherently undesirable. Any process which would reduce the dehydration required by the last process would be an advance in this art.

It has been determined that greases normally prepared by the "direct transfer process" exhibit non-uniform properties. In other words, samples of any one preparation of grease indicate that the hydrophobic surface-active agent has not been uniformly dispersed on the gel surface. It is evident that improvements in the process are required to produce hydrogels wherein the particles are uniformly coated with at least a monomolecular layer of the hydrophobic surface-active agent in order to produce greases having uniform properties throughout a given batch.

It is an object of the present invention to improve the process for the preparation of inorganic gel greases. It is a specific object of the present invention to reduce the evaporation requirements formerly necessary in inorganic gel grease preparation. Other objects will become apparent from the description of the invention. A specific object comprises the improved process for producing a partially dewatered inorganic hydrogel.

Now, in accordance with the present invention, it has been found that the above and other objects are accomplished by heating a hydrophobic surface-active agent and a hydrogel of an inorganic colloid at a temperature above about 60° C. for a period of at least 30 minutes. It has been discovered that under these conditions a gel is created having uniformly hydrophobic properties of substantially improved filterability from which a substantial proportion of the water may be separated prior to incorporation in a water-immiscible lubricating oil. Still in accordance with the present invention, it has been found that the filterability of the product is substantially improved by carrying out water separation before the heated mixture of hydrogel and hydrophobic agent have cooled below a minimum temperature of 60° C.

By operating under the conditions according to this invention, it has been found that at least 25% of the water present in the hydrogel can be eliminated therefrom prior to incorporation with the lubricating oil. Moreover, due to the heat treatment, whose minimum conditions are given above, greases produced thereby have uniform properties, apparently caused by an even distribution of the hydrophobic surface-active agent upon the surface of the gel particles. As stated hereinbefore, still further improvements in the coated hydrogel process are accomplished when water is separated therefrom while the gel is still hot from its original heat treatment in the presence of the hydrophobic surface-active agent.

These aspects will be more fully discussed hereinafter.

While the inventive steps are chiefly important in a grease-forming process, they also serve to improve other processes involving the production of compositions containing waterproofed colloidal inorganic gel particles. A specific case of the latter is oil base drilling muds, which may contain gels as produced according to this invention.

While the present description refers in the main part to a new treatment of hydrogel, it is to be understood that the same treatments are applicable to hydrosols. The latter is especially useful, since clays readily form hydrosols but normally form hydrogels only upon the addition of an onium compound. On the other hand amorphous colloids, such as silica, may be treated according to the present invention in the form of their hydrogels. Broadly, therefore, the invention contemplates a new treatment of a hydrous inorganic colloid which is in the form of either a hydrosol or a hydrogel.

These gels, for example silica, may be produced by addition of an acid to a sodium silicate solution or, conversely, by the addition of sodium silicate solution to an acid. Certain differences which are immaterial to the present invention are produced by these two alternative gel-forming methods. It is a preferred practice in initiating the present process to prepare colloidal dispersions containing between about 0.5 and 10% by weight of the inorganic colloid. The best results are obtained, however, when the colloidal dispersion contains between about 1 and 5% by weight of the inorganic material. Using silica as a specific example of the materials contemplated, a commercial sodium silicate solution may be acidified with dilute sulfuric acid to form a hydrosol which shortly is converted to a hydrogel containing appreciable amounts of sodium sulfate. This is normally washed by decantation and usually requires two or more changes of water to eliminate the substantial amounts of sodium sulfate present. However, filtration methods may be resorted to, or the hydrosol may be contacted with ion exchange resins to remove the salt.

The hydrophobic surface-active agent to be added to the colloidal dispersion is exemplified by high molecular weight aliphatic amines, preferably an amido amine formed by the partial amidation with stearic acid or tall oil acids of the reaction product of epichlorohydrin and ammonia. Other types of surface-active agents suitable for use in this process will be outlined hereafter. In order to provide the gel with the proper water-repellant character necessary for its correct function as a grease-forming agent, the surface-active agent should be hydrophobic in character especially at about room temperature. However, it should be dispersible (if not soluble) in hot water at about 60° C. or higher. Such an agent is normally regarded as a hydrophobic material since it promotes waterproofing properties at about room temperature.

In accordance with this invention the hydrophobic surface-active agent is added to an aqueous colloidal dispersion of the inorganic colloid in an amount of at least 25% by weight of the inorganic colloid under the conditions of time and temperature already described. The surface-active agent may be added to the relatively cold aqueous colloidal dispersion or it may be added to the dispersion after it has been heated above room temperature. In either case, agitation is highly desirable in order to effect maximum dispersion of the surface-active agent throughout the colloidal system. Thereafter, the temperature is raised above 60° C. for a period of at least thirty minutes. It is a preferred practice to carry out this heating within the temperature range of 70–100° C. for a period of at least forty-five minutes although little is accomplished by heating beyond about four hours. Although the hydrogel may be boiled during the treatment, substantial evaporation of water thereby is not a major object of the treatment.

In accordance with one phase of this invention it has been noted that the hydrophobic surface-active agent disperses in hot aqueous colloidal dispersion at a substantially faster rate than if the inorganic colloid is not present. Still, in accordance with this invention, it has been noted that uniformity of the final greases is substantially improved by heating the hydrophobic surface-active agent in an aqueous colloidal dispersion for at least thirty minutes beyond the point at which all of the agent is apparently homogeneously dispersed in the aqueous phase whether this dispersion amounts to colloidal dispersion or to true solution.

The heat treatment given this mixture of aqueous colloidal dispersion and surface-active agent results unexpectedly in the formation of hydrogel particles having the property of greatly improved filterability. It will be understood that the term "filterability" is used to indicate the ability of the coated gel particles to separate from the water phase regardless of whether this is done by filtration or by other separation methods. The observation of this improved property was the key to the improvement in the grease-forming process, which eliminated the necessity for excessive evaporation treatment subsequent to oil addition. Due to the improved filterability of the coated hydrogel particles, it was found possible to separate at least 25% and preferably more than 50% by weight of the water present in the aqueous hydrogel system. This separation could be carried out by means of filtration, centrifuging, or settling and decanting.

The operation of this invention is substantially improved by carrying out the separation of water from the heat treated hydrogel and surface-active agent mixture while the latter is still at a temperature above 60° C. immediately following the period of heat treatment. It has been found that the filterability of the mixture under such circumstances is substantially greater than if the mixture has been allowed to cool to lower temperatures or even if, after cooling, it has been reheated to temperatures above 60° C. The reason for this improvement in filtration characteristics is obscure but is probably based upon the changes in gel formation which may occur with alteration in thermal treatment. By separating water at temperatures above about 60° C. from the treated mixture, an advantage of as much as about 25% in shortened separation time is gained as compared with the time required when other conditions are employed. Again it is to be emphasized that the separation of water is referred to in terms of "filterability" but it will be understood that this term refers to the ability of the gel to be separated from water contained therein whether separation is carried out by filtration or by other separation means.

A principal advantage of the present invention resides in the elimination of water from the hydrogel mixture so that the evaporation load in the normal dehydration step is greatly reduced. In the methods of grease preparation formerly employed, it was necessary to remove all of the water either prior to incorporation with the hydrophobing agent or subsequent to incorporation of both the agent and the oil. This necessarily required evaporation techniques since in the first of these possibilities the hydrogel exhibits exceedingly low separation rates from water and in the second case it has not been found possible to separate water from the mixture of oil, gel and hydrophobing agent by means other than by evaporation. It will be recognized that any improvement which reduces the volume of water which must be removed by evaporation constitutes an advance in the art of the preparation of these greases.

Following the heat treatment of the gel and hydrophobing agent and the separation of water from the mixture, as described above, a water-immiscible lubricating oil is added to the partially dehydrated mixture. This is preferably performed while violently agitating the mixture after which the entire composition is subjected to shearing action to obtain what may be termed an "aqueous grease." The purpose of this shearing action is primarily to disperse the partially dehydrated gel throughout the oil in such a way that the gel particles become intimately associated with the oil. The best means for obtaining such a thorough dispersion as is required is by forcing the whole composition through extremely small orifices under high pressures. The orifices in question are preferably in the order of 0.01-0.025 inch in diameter and about 3 to 12 inches long, while the pressure is preferably above 1000 pounds and normally will be between about 5,000 pounds and 12,000 pounds per square inch. It is preferred that in carrying out this step the mixture be initially at a temperature below about 50° C. The combination of relatively low temperatures, extremely high pressures and small orifices combine to produce the degree of shearing required for the preparation of the desired aqueous greases. The mixture may be subjected to from one to about six or more passes through this system in order to attain a suitable degree of homogenization of the mixture.

Subsequent to the preparation of the aqueous grease, the composition is subjected to dehydration conditions to eliminate substantially all of the water therefrom. It will be understood that the term "substantially all of the water" is meant to include the elimination of water so as to leave not more than about 1.5% based on the final grease composition. The presence of small amounts of water in the final grease has been found to be highly desirable since it appears to improve substantially the gelling properties of the grease. The dehydration may be carried out under a variety of conditions, but it is preferable to subject the grease to as short a period of heating as possible consistent with economic considerations and the requirement for substantially complete water removal. The simplest means for this purpose comprises a planetary-drive, scraped wall mixer heated to a temperature of approximately the boiling point of water, which is dependent upon the pressure in the system. For example, the temperature may be relatively low if reduced pressure is employed. A more preferred type of apparatus may be called an "agitated film dryer." This apparatus comprises a non-vertical tube, preferably jacketed for heat control. It may be positioned in a horizontal or diagonal manner dependent upon the arrangement of the balance of the equipment. In the interior of this tube a set of blades is positioned to scrape, or nearly scrape, the walls of the tube throughout its length. These blades are actuated by a motor positioned outside of the tube in such a way as to turn the blades at a speed of approximately 200 to 500 R. P. M. It has been determined that if the blades actually contact the surface of the tube, a rapid rate of erosion occurs, apparently due to the nature of the gel particles. It is therefore preferred that the scraper blades be positioned to give a clearance of approximately 0.002-0.005 inch. The aqueous grease composition is introduced into this tube at or near one end thereof and preferably flows by gravity through the tube. While the apparatus may be operated at any temperature capable of water removal, it has been found convenient to employ a temperature at the surface of the gel within the dryer of approximately 120-180° C. It may require more than one pass through this dryer to eliminate the desired amount of water so as to produce a grease containing less than about 1.5% by weight of water.

Following the elimination of water from the system, it is necessary to subject the dehydrated composition to shearing action in order to produce a satisfactory grease structure. The oil, gel and surface-active agent mixture emerging from the dehydration equipment is in the form of a slurry having the consistency of a heavy oil. This is preferably subjected to shearing action in the same type of orifices described above having diameters of approximately 0.01-0.025 inch and approximately 3 to 12 inches long. However, an alternative piece of equipment, which may be employed, is a homogenizer such as that available on the market bearing the trade-mark "Manton Gaulin" homogenizer. The use of the latter type of apparatus in conjunction with the described orifice tubes substantially reduced the amount of recycling necessary to obtain the desired minimum penetration of the grease composition. Moreover, to reach a given minimum figure, the solids requirement was reduced by approximately 15% when using the Manton Gaulin homogenizer as compared with the orifice-pump combination. Furthermore, it was determined that temperatures of approximately 20-55° C. are suitable for the homogenizing equipment. In addition to the above, homogenizers or paint mills may be utilized.

The grease preparation process involving the steps of the present invention may be carried out with a wide variety of ingredients. The lubricating oils to be used are substantially water-immiscible materials and may be of synthetic or natural origin or mixtures thereof. The preferred type of lubricating oil is a mineral oil having a viscosity of at least an SAE-10 lubricating oil but for high temperature purposes heavier oils are desirable. A particularly suitable type of lubricating oil for use in high temperature greases is that known as "bright stock." Preferably this has a viscosity index of at least 60 and a (Dean and Davis) viscosity higher than about 1250 SUS at 100° F. This viscosity may vary between 1250 and 11,000 but usually will be between about 1500 and 3500 SUS at 100° F. The promotion of stability by extraction of aromatics is highly desirable and the aniline point of the lubricant is preferably above 100° C. Lubricating oils of this variety are also known as "cylinder stock" or "steam-refined stocks" but are preferably refined varieties of these latter fractions.

In addition to mineral lubricating oils, other lubricants may be present either as the sole lubricant or in admixture with the mineral oil. Especially desirable classes for this purpose are the esters of phosphorus acids, such as trioctyl phosphate; di(2-ethylhexyl) hexanephosphonate; bis-1,3-(dioctyl phosphono) butane and similar phosphorous esters. Other suitable lubricants include esters of aliphatic dicarboxylic acids wherein the alcohol radical contains an aliphatic hydrocarbon chain having between 4 and 12 carbon atoms and the dicarboxylic acid radical contains from 6 to 12 carbon atoms. Suitable species in this category include bis(2-ethylhexyl) sebacate and bis(isooctyl) adipate. Polymeric oxyalkylene compounds are also suitable such as polypropylene oxide and its copolymers with ethylene oxide, as well as corresponding polymers of other glycols, such as polymers of trimethylene glycol.

Inorganic gelling agents suitable for use in these greases are broadly divided into two main classes, namely, the crystalline materials and those having amorphous structures. The crystalline substances are principally confined to clays of either synthetic or natural origin. Preferably they are of such structure that they are termed "swelling clays" and of these the montmorillonites are especially preferred. The exact composition of the complex silicates comprising such materials is not subject to precise description since they vary widely from one natural source to another. They may be described as complex inorganic silicates, such as aluminum silicates, magnesium silicates, beryllium silicates and the like. Two principal types of bentonites, which are especially useful, are the Wyoming bentonite and hectorite. The latter material, possibly due to its high magnesium content, has been found to produce greases having exceptionally satisfactory corrosion characteristics. In addition to these naturally occurring clays, synthetic materials may be produced having the usual properties of clays as well as exhibiting similar X-ray defraction patterns. Methods for producing synthetic materials resembling naturally occurring clays have been published.

In addition to the crystalline colloids, amorphous substances are also useful for the production of grease structures. For the most part these are metallic oxides, hydroxides, sulfides, silicates, sulfates and chlorides or mixtures of such substances. Silica is especially useful due to its low cost and ready availability, as well as to its satisfactory property of forming greases readily. Alkaline earth metal hydroxides are also desirable, especially when mixed with silica to form a mixture of the oxides or, preferably, to form reaction products therewith, constituting mixtures of silica with magnesium silicate. While there are indications that low surface area of an inorganic colloid is not controlling in its ability to form grease structures, it is preferred that these colloids have surface areas of at least about 50 square meters per gram and, still more preferably, of about 100–350 square meters per gram. Gels produced according to the process of the present invention have been found to possess surface areas generally within the latter range. Gels having suitable dimensions are those having particle size diameters less than about 100 millimicrons and usually from 1 to 75 millimicrons.

Hydrophobic surface-active agents useful in this process may be predominantly cationic, ionic or non-ionic in character. Preferably they are cationic materials exemplified by high molecular weight amines. Ordinarily, in order to provide sufficient hydrophobing action, the surface-active agents should contain at least one hydrocarbyl radical per molecule having at least 12 carbon atoms. Cationic materials include not only amines but are derivable from "onium" compounds in general, including ammonium, phosphonium, sulfonium, arsonium and like compounds. It will be understood that the surface-active agent may act by adsorption on the surface of the gel or by reaction therewith. The latter possibility is utilized especially in the case of the high base exchange clays, such as hectorite and Wyoming bentonite. In this case the hydrophobing action may be carried out by the use of hydrophobic onium compounds such as quaternary ammonium salts. These ammonium compounds include salts of aliphatic, alicyclic, aromatic and heterocyclic amines including primary, secondary and tertiary amines and polyamines, as well as quaternary ammonium compounds. Illustrative examples of other classes of suitable compounds are triphenyl alkyl phosphonium or stibonium halides, dialkyl or diaryl phosphonium or sulfonium halides. The most desirable group of these compounds is the quaternary ammonium salts such as trimethyl heptadecyl ammonium chloride; dimethyl diheptadecyl ammonium chloride; and other ammonium salts of inorganic acids, such as octadecyl heptadecyl ammonium bromide or tridodecyl ammonium chloride, ammonium salts of organic acids including heptadecyl ammonium acetate.

In addition to the cationic materials, such as those described, other aliphatic amines and polyamines, as well as derivatives thereof, also are useful. It has been found, for example, that amido amines are particularly effective not only as hydrophobing agents but also for the improvement in corrosion characteristics of these greases. In addition to the aliphatic long-chain amines having 12 or more carbon atoms per molecule, such as octadecyl amine, complex substances may be employed, such as the partial amides formed by fatty acids or rosin acids with aliphatic polyamino hydroxy compounds. Representative ones of the latter can be prepared, for example, by the condensation of ammonia with halohydrins such as epichlorohydrin. In place of ammonia a primary or secondary amine may be employed. The preferred product is the condensation product of epichlorohydrin and ammonia which has been converted to a partial amide having between ¼ and ¾ of its amino groups in the amide form, utilizing fatty acids or rosin type acids such as those derived from tall oil or the acids of animal or vegetable fats and oils. Similar products may be obtained by condensation of acrolein and ammonia.

In addition to the cationic surface-active agents, anionic materials may be employed, such as higher fatty acids having at least 12 and preferably at least 16 carbon atoms per molecule, such as stearic acid and its higher homologs. A particularly desirable derivative of fatty acids, having improved emulsification characteristics and corrosion-preventing properties, comprises the hydroxy fatty acids such as 12-hydroxy stearic acid. The acids may be present as such or in the form of their soaps, preferably polyvalent metal soaps and, still more preferably, amphoteric metal soaps. Preferred varieties of soaps include aluminum 12-hydroxy stearate and lead 12-hydroxy stearate as well as calcium naphthenate.

In order to provide satisfactory hydrophobing properties, the surface-active agent should be present in an amount of at least 25% by weight of the inorganic colloid. Dependent upon the identity of the colloid and the hydrophobic properties of the surface-active agent employed, this amount is preferably within the range of about 40% to about 75% by weight of the colloid. This proportion will also vary with the surface area of the colloidal particles since it has been found that approximately 75% of the gel particles should bear at least a monomolecular layer of the surface-active agent if the grease is to possess satisfactory water-resistant properties.

The examples which follow illustrate the various phases of this invention. It will be understood that the principal advantage gained comprises the elimination of excessive evaporation requirements subsequent to incorporation of the hydrogel and surface-active agent in the lubricating oil. Another important result comprises the uniformity of gels so produced.

Example I

Ninety-four pounds of a silica hydrogel containing 4.75 pounds silica is prepared from aqueous sodium silicate and sulfuric acid. 2.13 pounds of a cationic hydrophobic surface-active agent (described hereinafter) is added to this hydrogel, which is contained in a vat heated by a steam coil and agitated by a propeller stirrer. The agent dissolves in about 20 minutes, by which time the temperature has reached 81° C. Heating is continued for 35 minutes to a temperature between 95° and 97° C. At this point it can be noted that the hydrogel appears homogeneous and that the surface-active agent is apparently evenly distributed throughout. The mixture is filtered in about 40 minutes using an Oliver continuous vacuum filter having three square feet of filter surface covered with a filter cloth. Approximately 40% of the water is removed from the hydrogel by this filtration. Subsequent thereto the partially dehydrated gel is agitated with 50 pounds of a light refined mineral lubricating oil, subjected to milling to create a hydrous grease structure and then processed in the agitated film dryer, described hereinbefore, to remove substantially all of the water to a figure lower than about 0.5% water based on the final grease. Following dehydration the resulting slurry is milled to obtain a grease structure.

The cationic surface-active agent utilized in this grease is a one-third amide formed between animal fat acids and a condensation product of epichlorohydrin and ammonia. This condensation product is preparable as follows: Epichlorohydrin is added in small incremental portions to concentrated aqueous or alcoholic ammonia at temperatures between about 20° and about 60° C., preferably between 30° and 50° C. The time of addition may vary widely but is preferably in the order of ½–1 hour although times as short as about 10 minutes may be employed. Following an extra heating period of about 30–90 minutes, excess ammonia is removed. In the condensation reaction a weight ratio of ammonia to epichlorohydrin of between 5 to 1 and 10 to 1 is preferred. The inorganic halide of the halohydrin is converted to an inorganic salt (such as by the addition of caustic) which is filtered or decanted from the product. After removal of water or other solvent which is present, it is found that a complex mixture of condensation products has been obtained comprising predominantly 5–25% of 1,3-diamino-2-hydroxy propane in addition to dimers and higher polymers thereof. This mixture is then reacted with animal fat acids (or acids from other equivalent higher fatty acid sources) and heated at a temperature between 150° and 225° C. for periods between 15 minutes and 24 hours. It has been found that the use of ratios enabling the production of partial amides having between ¼ and ¾ of the amino nitrogen groups in amide form, results in the preparation of hydrophobic surface-active agents having optimum properties for the present purpose.

Example II

One hundred eighty pounds of hydrogel containing ten pounds of silica is heated to about 80° C. At this point three pounds of the same hydrophobic surface-active agent used in Example I is added after which the mixture is raised to a temperature of 95°–100° C. and held at this point for approximately 1 hour. After cooling, the mixture is filtered in the same type of apparatus used in Example I to remove approximately one-half of the water present. The partially dehydrated and waterproofed gel is then mixed with a light lubricating oil and converted into a grease as described in the previous example.

Example III

Seven hundred fifty pounds of a hydrogel containing 1.25% of a mixture of silica (95%) and magnesia (5%) is heated for one hour at 100° C., together with 3.75 pounds of the same surface-active agent employed in Example I. This mixture is then filtered before it has cooled below 60° C. to remove approximately one-half of the water present in the mixture. Filtration of the hot hydrogel proceeds at a rate approximately 25% faster than in similar preparations wherein the gel has been cooled to room temperature. The concentrated gel can then be processed, as described above, to produce a grease structure.

Example IV

Five hundred pounds of silica hydrogel containing 2% by weight silica is prepared and heated to 75° C. At this point five pounds of lead 12-hydroxy stearate is added and heating is continued for approximately two hours at the same temperature. The resulting waterproofed hydrogel shows evidence of separating from excess water which is removed by settling and decantating. The resulting partially dehydrated gel is then converted to a grease structure by incorporation of a mixture of equal quantities of bright stock and trioctyl phosphate followed by dehydration and homogenizing.

Example V

Two pounds of hectorite clay is dispersed in approximately one hundred pounds of water. To this hydrosol, one pound of dimethyl dioctadecyl ammonium bromide is added, after which the mixture is heated for 30 minutes at 85° C. The addition of the quaternary salt causes gellation, the "onium clay" so formed tending to separate from the water phase. Approximately 75% of the water is separated from the onium clay by centrifuging. The remaining hydrous gel is mixed with mineral lubricating oil and processed to create a grease structure.

We claim as our invention:

1. The process for the preparation of a lubricating grease composition which comprises heating a mixture of a hydrophobic aliphatic amine and a silica hydrogel at a temperature between about 70° and about 100° C. for a period between about 45 minutes and 4 hours, filtering at least 25% of the water from said mixture after heating, commingling the partially dehydrated mixture with a water-insoluble lubricating oil and substantially completely dehydrating the resulting grease composition.

2. The process for the preparation of a lubricating grease composition which comprises heating a mixture of a hydrophobic surface-active agent and an aqueous colloidal dispersion of a grease-forming inorganic colloid at a temperature between about 60° C. and about 100° C. for a period of time between about 30 minutes and about 4 hours, removing at least about 25% by weight of the water present in said heated mixture, commingling the partially dehydrated mixture with a water-immiscible lubricating oil, substantially dehydrating the resulting composition and subjecting it to shearing action whereby a grease composition is formed.

3. The process for the preparation of a lubricating grease composition which comprises heating a stearic acid partial amide of a condensation product of epichlorohydrin and ammonia with a hydrogel comprising a mixture of magnesia and silica, at a temperature between about 75° and about 100° C. for a period of time between about 45 minutes and about 4 hours, filtering at least about 50% by weight of the water from said mixture, commingling the partially dehydrated mixture with a mineral lubricating oil, substantially completing the dehydration of the resulting composition and subjecting it to shearing action whereby a grease structure is formed.

4. The process for the preparation of a lubricating grease composition which comprises heating a mixture of a hydrophobic cationic surface-active agent and an inorganic hydrogel of an amorphous colloid at a temperature between about 70° and 100° C. for a period of time between about 45 minutes and 4 hours, removing at least about 25% by weight of the water from said heated mixture, commingling the partially dehydrated mixture with a water-insoluble mineral lubricating oil, substantially completing the dehydration of the resulting composition and subjecting it to shearing action whereby a grease structure is formed.

5. The process for the preparation of a lubricating grease composition which comprises heating a mixture of a hydrophobic aliphatic cationic surface-active agent and a hydrogel of an inorganic amorphous colloid at a temperature between about 70° and 100° C. for a period of time between about 30 minutes and about 4 hours after the surface-active agent is dispersed in the hydrogel, filtering at least 50% by weight of the water from said mixture, commingling the partially dehydrated mixture with a mineral lubricating oil, substantially completing the dehydration of the resulting composition and subjecting it to shearing action whereby a grease structure is formed.

6. The process for the preparation of a lubricating grease composition which comprises heating a mixture of a hydrophobic aliphatic amino amide containing at least 12 carbon atoms per molecule and a hydrogel of a mixture of inorganic oxide and silicate at a temperature between about 70° and 100° C. for a period of time of at least 45 minutes and about 4 hours, filtering at least 50% of the water from said mixture after heating, commingling the partially dehydrated mixture with a water-immiscible mineral lubricating oil, substantially completing the dehydration of the resulting composition and subjecting it to shearing action whereby a grease structure is formed.

7. The process for the preparation of a lubricating grease composition which comprises heating a mixture of a hydrophobic surface-active agent and a hydrogel of an inorganic colloid at a temperature between about 60° C. and about 100° C. for a period of time between about 30 minutes and about 4 hours, centrifuging at least about 50% by weight of the water from said mixture, commingling the partially dehydrated mixture with a water-immiscible lubricating oil, substantially completing the dehydration of the resulting composition and subjecting it to shearing action whereby a grease structure is formed.

8. The process for the preparation of a lubricating grease composition which comprises heating a mixture of hydrophobic surface-active agent and a hydrogel of an inorganic colloid at a temperature between about 60° C. and about 100° C. for a period of time between about 30 minutes and about 4 hours, removing at least about 50% by weight of the water by settling and decantation, commingling the partially dehydrated mixture with a water-immiscible lubricating oil, substantially completing the dehydration of the resulting composition and subjecting it to shearing action whereby a grease structure is formed.

9. The process for the preparation of a lubricating grease composition which comprises heating a mixture of a hydrophobic cationic surface-active agent and an aqueous dispersion of a high base exchange clay at a temperature between about 60° C. and about 100° C. for a period of time between about 30 minutes and about 4 hours, removing at least about 50% by weight of the water from said mixture, commingling the partially dehydrated mixture with a water-immiscible lubricating oil, substantially completing the dehydration of the resulting composition and subjecting it to shearing action whereby a grease structure is formed.

10. The process for the preparation of a lubricating grease according to claim 2 wherein the lubricating oil comprises an ester of a phosphorus acid.

11. A process according to claim 2 wherein the lubricating oil comprises an ester of an aliphatic dicarboxylic acid.

12. The process for the preparation of a lubricating grease composition which comprises heating a mixture of a hydrophobic surface-active agent and a hydrogel of an inorganic colloid at a temperature between about 60° C. and about 100° C. for a period of time between about 30 minutes and about 4 hours, removing from the mixture while at a temperature above 60° C. at least about 50% by weight of the water therein by filtration, commingling the partially dehydrated mixture with a water-insoluble lubricating oil, substantially completing the dehydration of the resulting composition and subjecting it to shearing action whereby a grease structure is formed.

13. The process for the preparation of a partially dehydrated inorganic gel composition which comprises heating a mixture of a hydrophobic surface-active agent and an aqueous colloidal dispersion of a grease-forming inorganic colloid at a temperature between about 60° C. and about 100° C. for a period of time between about 30 minutes and about 4 hours and removing from said mixture at least about 25% by weight of the water therein by filtration.

14. A process according to claim 13 wherein the inorganic colloid comprises silica.

15. A process according to claim 2 wherein the inorganic colloid is a clay and the surface-active agent is a quaternary ammonium compound.

16. The process for the preparation of a lubricating grease composition which comprises heating a mixture of a hydrophobic surface-active agent and a hydrosol of a high base exchange clay at a temperature between about 60° C. and about 100° C. for a period between about 30 minutes and about four hours, removing at least about 25% by weight of the water from said mixture, commingling the partially dehydrated mixture with a water-immiscible lubricating oil and substantially completing the dehydration of the resulting composition.

References Cited in the file of this patent

UNITED STATES PATENTS

| Number | Name | Date |
|---|---|---|
| 2,531,427 | Hauser | Nov. 28, 1951 |
| 2,531,440 | Jordan | Nov. 28, 1951 |

OTHER REFERENCES

Jordan "Organophilic Bentonites," Jour. of Physical and Colloid Chemistry, vol. 53, No. 2, February 1949, pp. 294–306. Copy in Sci. Lib.